United States Patent
Surnilla et al.

(10) Patent No.: US 9,657,680 B2
(45) Date of Patent: May 23, 2017

(54) ZERO FLOW LUBRICATION FOR A HIGH PRESSURE FUEL PUMP

(71) Applicant: Ford Global Technologies, LLC, Dearborn, MI (US)

(72) Inventors: Gopichandra Surnilla, West Bloomfield, MI (US); Hao Zhang, Ann Arbor, MI (US); Mark Meinhart, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/586,683

(22) Filed: Dec. 30, 2014

(65) Prior Publication Data

US 2016/0186682 A1 Jun. 30, 2016

(51) Int. Cl.
*F02B 7/00* (2006.01)
*F02M 57/02* (2006.01)
(Continued)

(52) U.S. Cl.
CPC ..... *F02D 41/3082* (2013.01); *F02D 19/0605* (2013.01); *F02D 19/0628* (2013.01); *F02D 19/0634* (2013.01); *F02D 19/0655* (2013.01); *F02D 19/0684* (2013.01); *F02D 41/0025* (2013.01); *F02D 41/2464* (2013.01); *F02D 41/3094* (2013.01); *F02D 41/3845* (2013.01);
(Continued)

(58) Field of Classification Search
CPC ..... F02D 2041/3881; F02D 2200/0602; F02D 2200/0606; F02D 2200/0611; F02D 41/0025; F02D 41/2464; F02D 41/3082; F02D 41/3094; F02D 41/3845; F02M 63/0285

USPC ........ 123/445, 456, 463, 495, 497, 508, 431
See application file for complete search history.

(56) References Cited

U.S. PATENT DOCUMENTS 6,557,530 B1   5/2003   Benson et al.
6,990,855 B2   1/2006   Tuken et al.
(Continued)

FOREIGN PATENT DOCUMENTS

EP    2284380 A2        2/2011
JP    2008175186 A  *   7/2008

OTHER PUBLICATIONS

Surnilla, Gopichandra et al., "Adaptive Learning of Duty Cycle for a High Pressure Fuel Pump," U.S. Appl. No. 14/099,615, filed Dec. 6, 2013, 44 pages.
Pursifull, Ross D. et al., "Methods for Determining Fuel Bulk Modulus in a High-Pressure Pump," U.S. Appl. No. 14/189,946, filed Feb. 25, 2014, 52 pages.
(Continued)

*Primary Examiner* — Marguerite McMahon
*Assistant Examiner* — Tea Holbrook
(74) *Attorney, Agent, or Firm* — Julia Voutyras; McCoy Russell LLP

(57) ABSTRACT

Methods and systems are providing for improving zero flow lubrication (ZFL) of a high pressure fuel pump coupled to direct fuel injectors via a direct injection fuel rail. A ZFL transfer function for the fuel pump is learned while fuel is at non-nominal fuel bulk modulus conditions and corrected for variations from a nominal fuel bulk modulus estimate. When zero flow lubrication of the pump is requested, the pump is operated with a duty cycle based on the learned transfer function and an instantaneous estimate of the fuel bulk modulus to compensate for differences in fuel condition from the nominal fuel bulk modulus estimate.

14 Claims, 10 Drawing Sheets

(51) Int. Cl.
  *F02D 41/30* (2006.01)
  *F02D 41/38* (2006.01)
  *F02M 63/02* (2006.01)
  *F02D 41/00* (2006.01)
  *F02D 41/24* (2006.01)
  *F02D 19/06* (2006.01)
  *F02M 25/022* (2006.01)
  *F02D 19/08* (2006.01)

(52) U.S. Cl.
  CPC ..... *F02M 63/0285* (2013.01); *F02D 19/0689* (2013.01); *F02D 19/0692* (2013.01); *F02D 19/084* (2013.01); *F02D 2041/3881* (2013.01); *F02D 2200/0602* (2013.01); *F02D 2200/0606* (2013.01); *F02D 2200/0611* (2013.01); *F02M 25/0228* (2013.01); *Y02T 10/36* (2013.01)

(56) References Cited

U.S. PATENT DOCUMENTS

| | | | |
|---|---|---|---|
| 8,220,322 | B2 | 7/2012 | Wang et al. |
| 8,483,932 | B2 | 7/2013 | Pursifull |
| 8,776,764 | B2 | 7/2014 | Basmaji et al. |
| 2009/0090331 | A1 | 4/2009 | Pursifull |
| 2012/0167859 | A1 | 7/2012 | Basmaji et al. |
| 2014/0224209 | A1 | 8/2014 | Pursifull et al. |

OTHER PUBLICATIONS

Pursifull, Ross D. et al., "Rapid Zero Flow Lubrication Methods for a High Pressure Pump," U.S. Appl. No. 14/231,451, filed Mar. 31, 2014, 54 pages.

* cited by examiner

ZERO FLOW LUBRICATION FOR A HIGH PRESSURE FUEL PUMP

FIELD

The present application relates to implementation of zero flow lubrication (ZFL) for a high pressure fuel pump in an internal combustion engine taking into account fuel system bulk modulus changes.

SUMMARY/BACKGROUND

Some vehicle engine systems utilize both direct in-cylinder fuel injection and port fuel injection. The fuel delivery system may include multiple fuel pumps for providing fuel pressure to the fuel injectors. As one example, a fuel delivery system may include a lower pressure fuel pump (or lift pump) and a higher pressure fuel pump arranged between the fuel tank and fuel injectors. The high pressure fuel pump may be coupled to the direct injection system, upstream of a fuel rail to raise a pressure of the fuel delivered to the engine cylinders through the direct injectors. However, when the high pressure fuel pump is turned off, such as when no direct injection of fuel is requested, pump durability may be affected, as the pump may be mechanically driven by the engine crank or camshaft. Specifically, the lubrication and cooling of the pump may be reduced while the high pressure pump is not operated, thereby leading to pump degradation.

To address this issue, various zero flow lubrication (ZFL) strategies may be applied. In one example approach, a zero flow lubrication strategy may use a known relation between the fuel rail pressure and the pump duty cycle for a given fluid at a given temperature condition. The learned transfer function is then used to determine a duty cycle to be output based on fuel rail pressure so as not to increase the fuel rail pressure when the determined duty cycle is applied. Specifically, the duty cycle applied may be adjusted to provide the desired lubrication to the high pressure pump without raising the rail pressure.

However the inventors herein have identified a potential issue with this approach. The transfer function is learned with the bulk modulus of the fuel system at the learning conditions to reduce part-to-part variability. For example, the transfer function may be learned with the bulk modulus at nominal conditions. However, when the learned transfer function is applied at conditions where the bulk modulus is different from the learning conditions, it can lead to errors. For example, the transfer function may be applied at non-nominal conditions. As such, the bulk modulus may change significantly with fuel temperature, fuel pressure, as well as fuel type. The errors may be such that the applied duty cycle does not provide the desired lubrication. Further, the error may raise the fuel pressure when it is desired not to. Overall, fuel pump performance is degraded.

In one example, the above issues may be addressed by a method for an engine fuel system comprising: learning a transfer function between duty cycle for a high pressure fuel pump and fuel rail pressure for a direct fuel injector for nominal bulk modulus conditions; and during conditions when not direct injecting fuel into an engine, operating the fuel pump with a duty cycle based on the learned transfer function and an instantaneous bulk modulus estimate. In this way, a transfer function for zero flow lubrication of a high pressure fuel pump may be learned more robustly, improving fuel pump lubrication.

As an example, in an engine system that is fueled via both port and direct injection, a high pressure pump may be used for increasing fuel pressure in a (direct injection) fuel rail connected to the direct injectors. A low pressure pump may be connected upstream of the high pressure pump and may provide pressure to port injectors on a different rail in addition to providing fuel to the high pressure pump inlet. During conditions when not direct injecting fuel into the engine, such as when only port injecting fuel into the engine, a zero duty cycle may be applied to the high pressure fuel pump for a duration to measure an average change in the direct injection fuel rail pressure over time due to fluctuations in fuel temperature. As such, this may be a reference (e.g., background) change in fuel rail pressure. Once the fuel rail pressure has normalized, and while still not direct injecting fuel into the spinning engine, a first duty cycle may be applied to the high pressure fuel pump and a resulting change in the direct injection fuel rail pressure may be recorded. The duty cycle of the high pressure pump may be incrementally changed in small amounts (e.g. 1%, 2%, 3%) and a fuel rail pressure data point may be recorded once the chamber pressure has stopped changing. A relationship between duty cycle and rail pressure can be learned at the present fuel conditions which may be different from nominal bulk modulus conditions. A duty cycle transfer function at nominal bulk modulus conditions may be adaptively learned based on the relationship by compensating for a variation in the fuel conditions at the time of the learning from the bulk modulus conditions. Then, during conditions when zero flow lubrication of the high pressure fuel pump is requested, such as when only port injecting fuel into the spinning engine, the learned transfer function at nominal bulk modulus conditions may be applied after adjusting the transfer function with a correction factor to compensate for differences between the nominal bulk modulus estimate and an instantaneous bulk modulus estimate. As such, the fuel bulk modulus at the time of zero flow lubrication may be different from the fuel bulk modulus at the time of learning the transfer function, both differing in varying degrees from the nominal fuel bulk modulus estimate. The instantaneous bulk modulus estimate may be determined as a function of fuel rail temperature, current fuel rail pressure and the type of fuel in the fuel rail. A duty cycle may be applied to the high pressure fuel pump based on the fuel-adjusted transfer function so as to not raise the fuel rail pressure and provide sufficient pump lubrication.

In this way, by learning a transfer function between duty cycle and rail pressure for a high pressure fuel pump, the robustness of zero flow lubrication controls for a high pressure fuel pump to adapt for various fuel systems and fuel types is improved. By determining the transfer function for nominal bulk modulus conditions and then applying the transfer function at non-nominal conditions while correcting for a difference between nominal bulk modulus and the bulk modulus at the time of applying the transfer function, duty cycle errors in ZFL control due to differences in fuel type and fuel system configuration are reduced. By enabling the transfer function to be learned at a first fuel condition and then be applied at a second, different fuel condition, zero flow lubrication can be easily adapted for various fuel systems and different fuel types without requiring the transfer function to be relearned at each fuel condition. Overall, the desired lubrication is achieved and the fuel pressure may not be raised above the desired pressure.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 2:
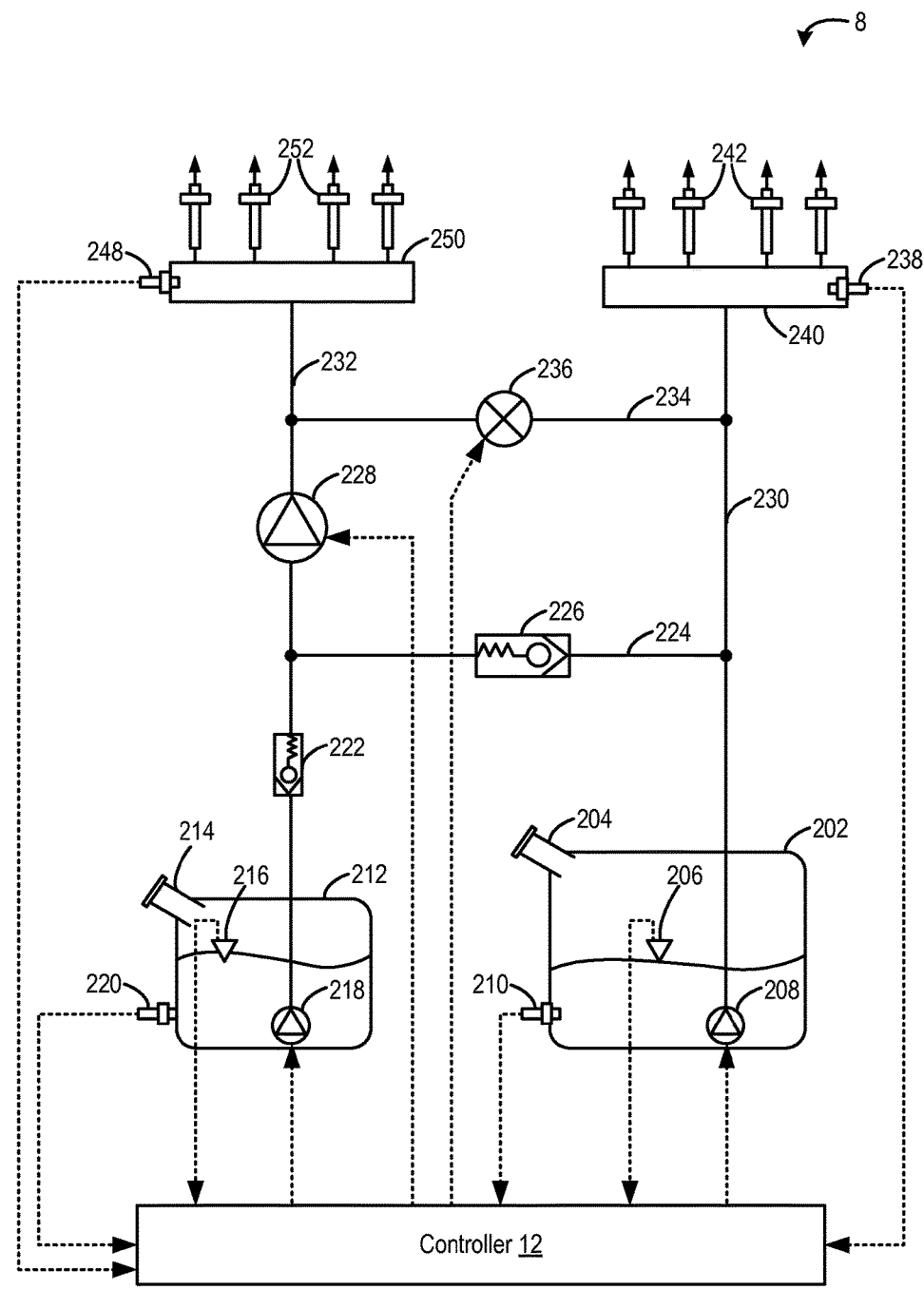
FIG. 2 schematically depicts an example embodiment of a fuel system that may be used with the engine of FIG. 1.
Figure 3:
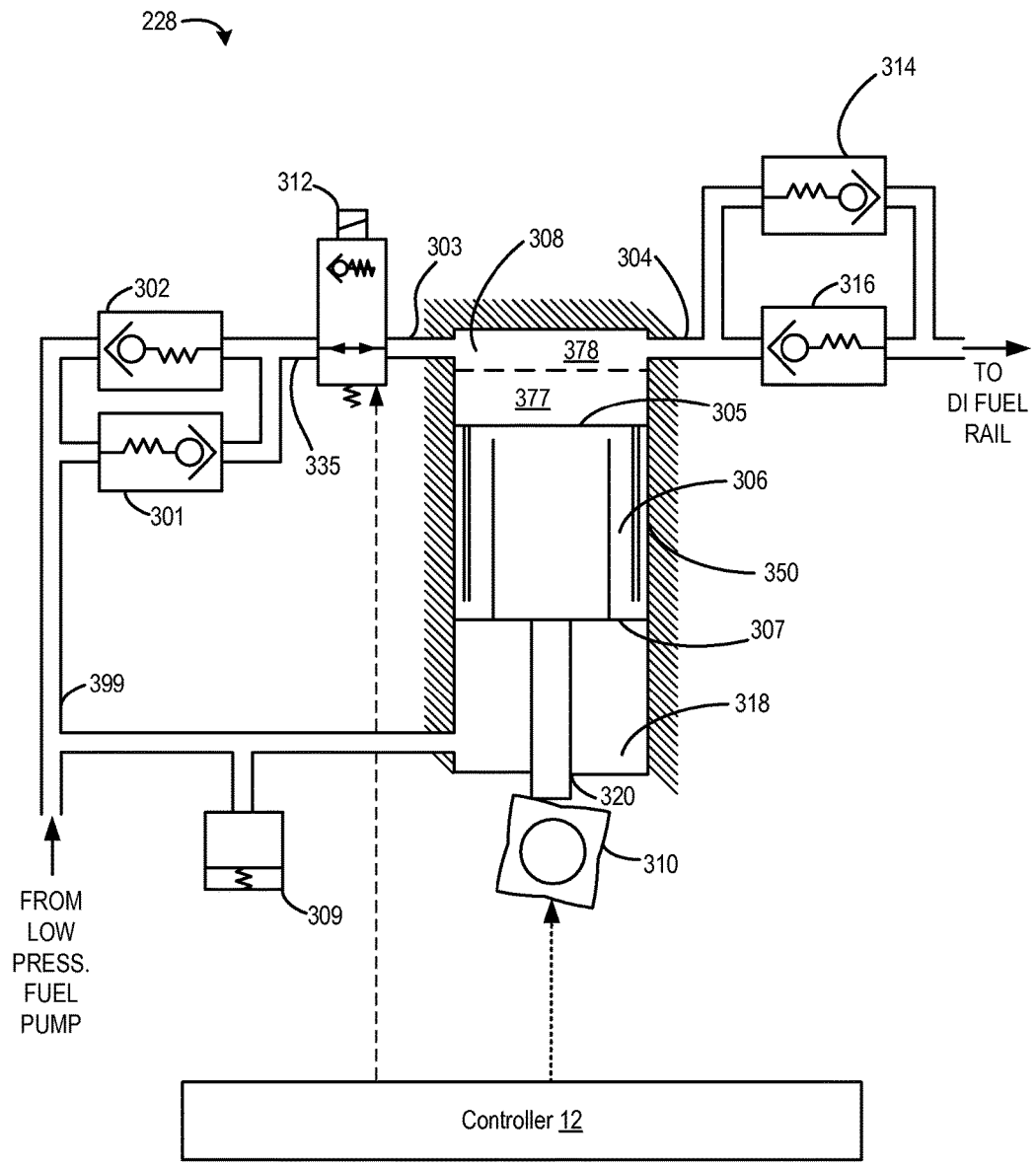
FIG. 3 shows an example of a high pressure direct injection fuel pump (HPP) of the fuel system of FIG. 2.
Figure 4:
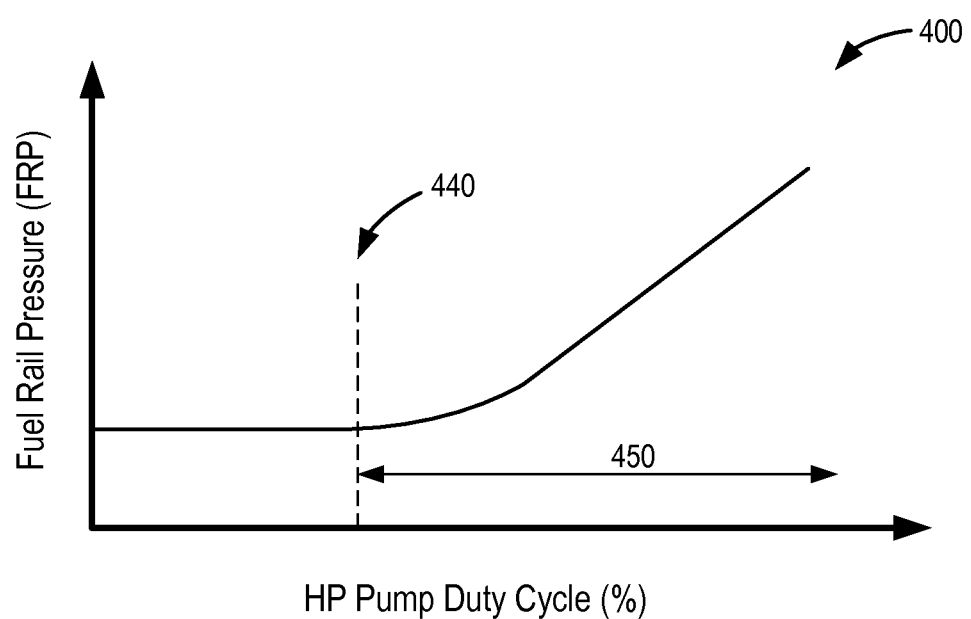
FIG. 4 depicts change in fuel rail pressure with change in HPP duty cycle during ZFL conditions.
Figure 5:
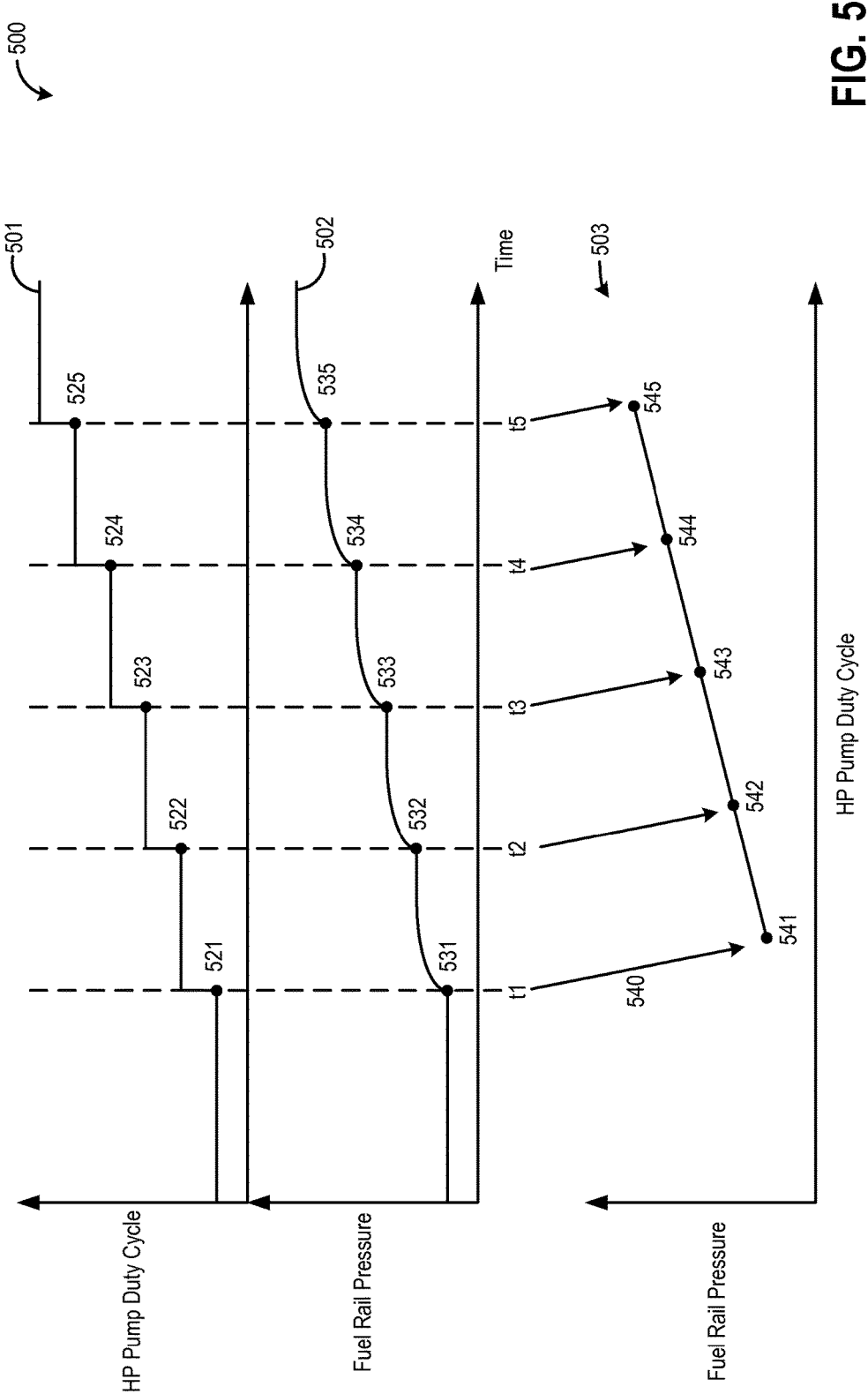
FIG. 5 depicts collection of data for a zero flow lubrication test over repeated cycles of a ZFL transfer function learning routine, such as the routine of FIG. 1 1.
Figure 6:
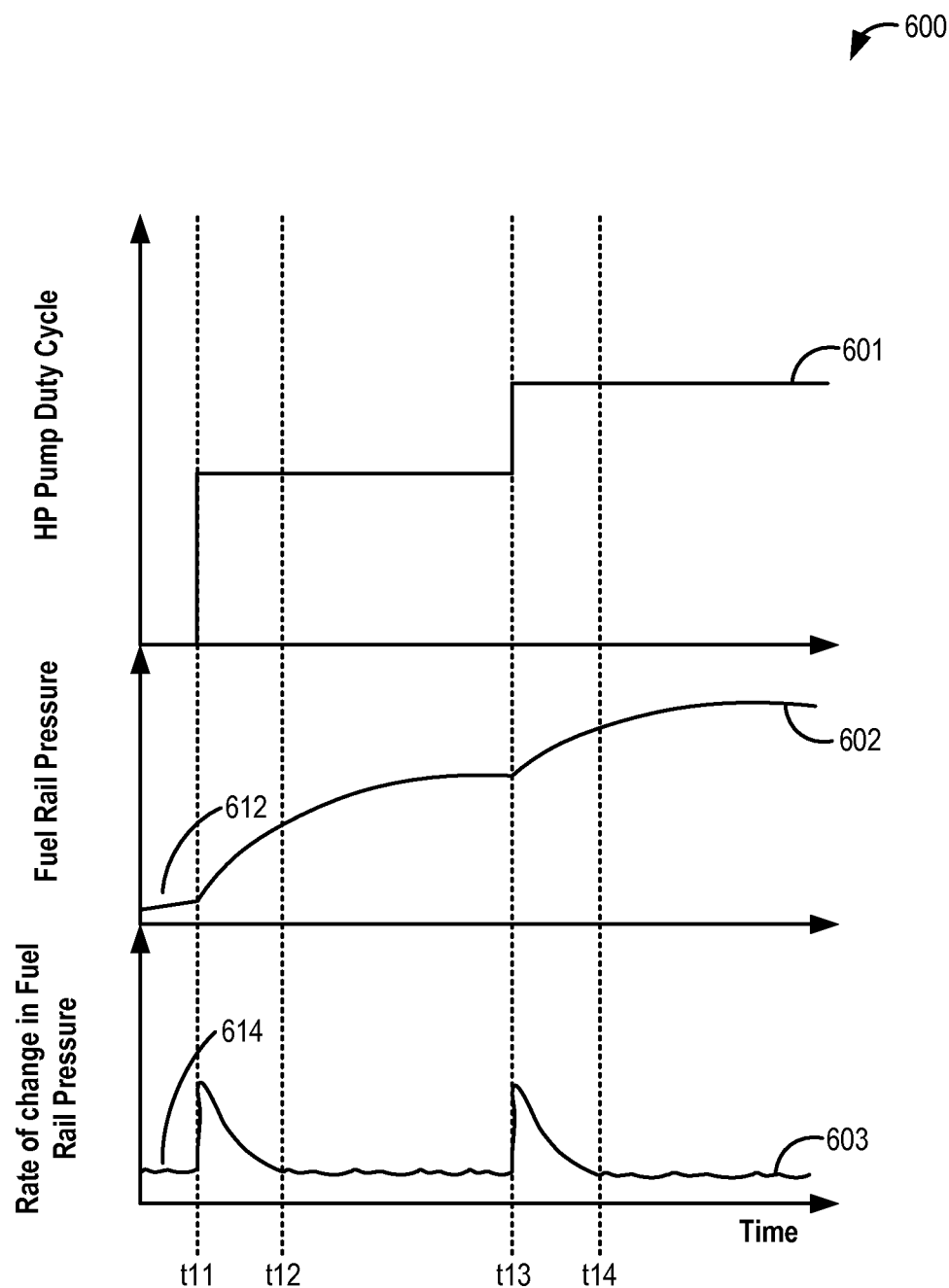
FIG. 6 shows a detailed example of changes in direct injection fuel rail pressure and high pressure fuel pump chamber pressure with changes to a duty cycle applied to a high pressure fuel pump.
Figure 7:
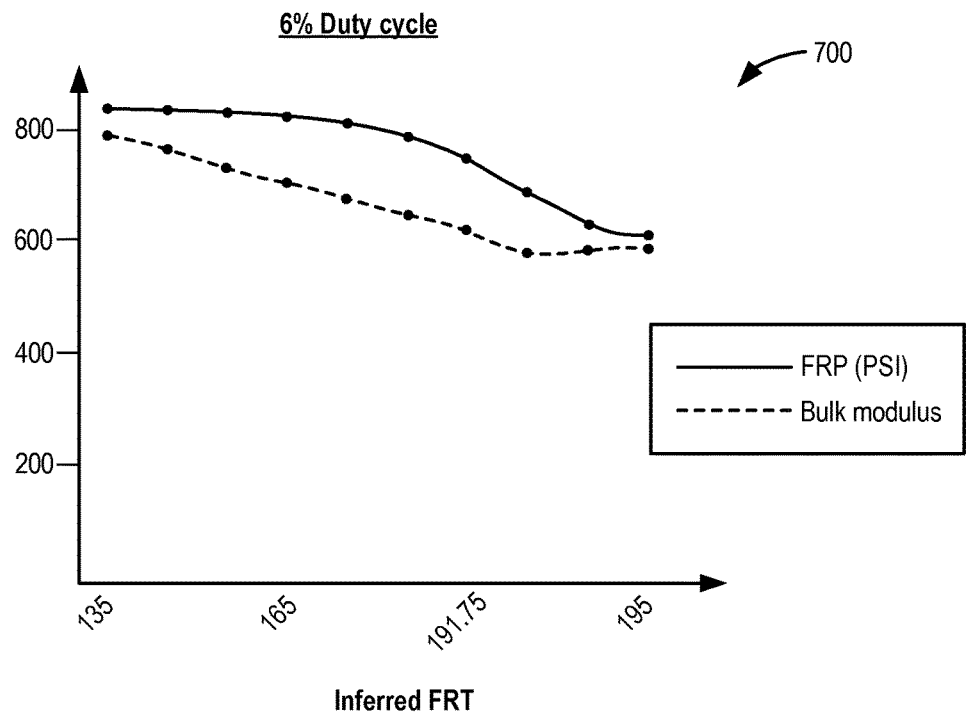
FIG. 7 depicts variations in ZFL transfer function with fuel rail temperature.
Figure 7:
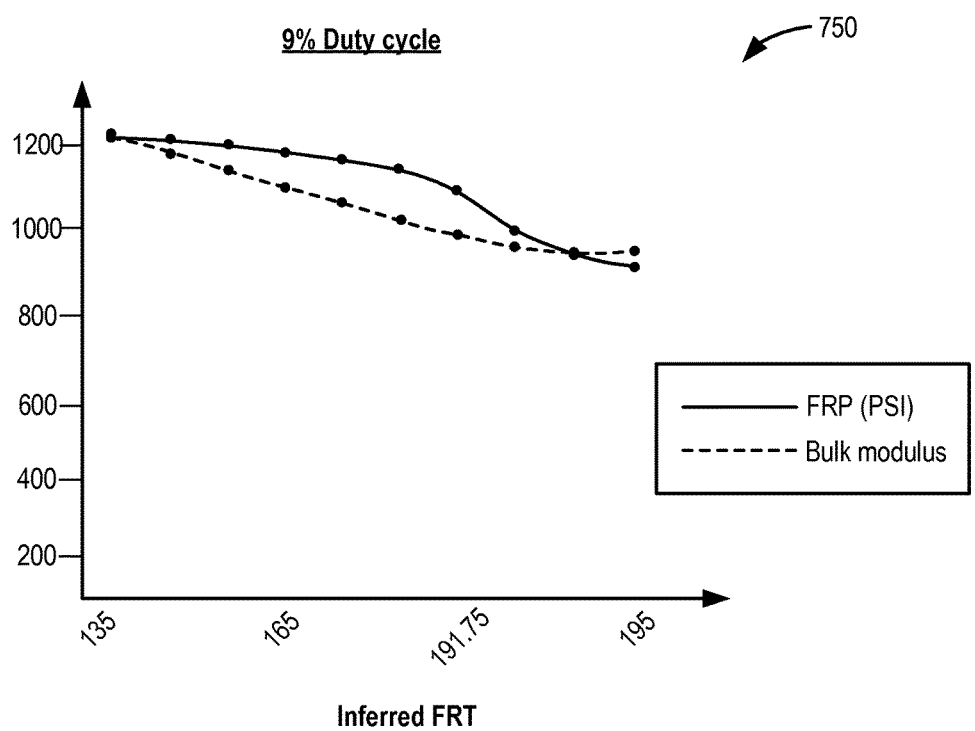
Figure 8:
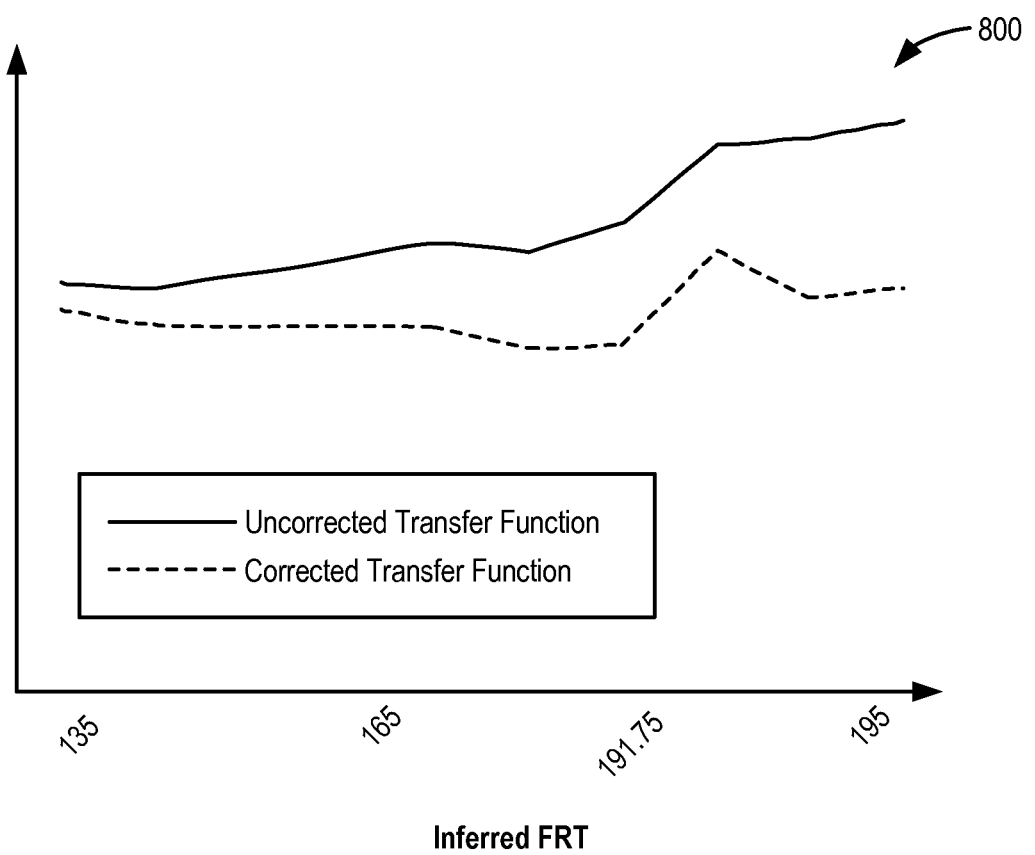
FIG. 8 depicts differences in ZFL transfer function with and without correction for changes in fuel bulk modulus.

The following detailed description provides information regarding a high pressure fuel pump, its related fuel and engine systems, and learning of a transfer function to enable zero flow lubrication of the pump. An example embodiment of a cylinder in an internal combustion engine is given in FIG. 1 while FIGS. 2-3 depict example fuel systems that may be used with the engine of FIG. 1. An example of a high pressure pump configured to provide direct fuel injection into the engine is shown in detail at FIG. 3. A controller may perform a control routine, such as the routine of FIGS. 9-10 to learn a transfer function between a duty cycle of the high pressure fuel pump and the fuel rail pressure of a direct injection fuel rail coupled downstream of the pump. The transfer function may be learned at non-nominal fuel bulk modulus conditions by incrementing the high pressure pump duty cycle and learning a corresponding fuel rail pressure once pump chamber pressure stabilizes (FIGS. 5-6). By repeating the steps, a plot can be generated which is then used to compute the transfer function (FIG. 4). The learned transfer function can be converted to and stored as a nominal fuel bulk modulus condition transfer function which is then applied when zero flow lubrication is requested. The learned transfer function may be corrected with a factor that is based on the current fuel bulk modulus conditions to compensate for the effect of change in fuel conditions on the learned transfer function (FIGS. 7-8). In this way, errors in fuel rail pressure control can be reduced.

Regarding terminology used throughout this detailed description, several graphs are presented wherein data points are plotted on 2-dimensional graphs. The terms graph and plot are used interchangeably to refer to the entire graph or the curve/line itself. Furthermore, a high pressure pump, or direct injection pump, may be abbreviated as a DI or HP pump or HPP. Similarly, a low pressure pump, or lift pump, may be abbreviated as a LP pump or LPP. Also, fuel rail pressure, or the value of pressure of fuel within fuel rail of the direct injectors, may be abbreviated as FRP. Zero flow lubrication (ZFL) may refer to high pressure pump operation schemes that involve pumping substantially no fuel into a fuel rail (which may include the direct injection fuel rail) while maintaining fuel rail pressure near a constant value or incrementally increasing fuel rail pressure. ZFL may be used to attain zero flow rate data, as further described below. As described in the summary above, pump duty cycle is used in reference to the high pressure pump and is also referred to as the closing of the spill valve, or valve timing. Also, the spill valve is equivalent to the solenoid activated inlet check valve.

Figure 1:
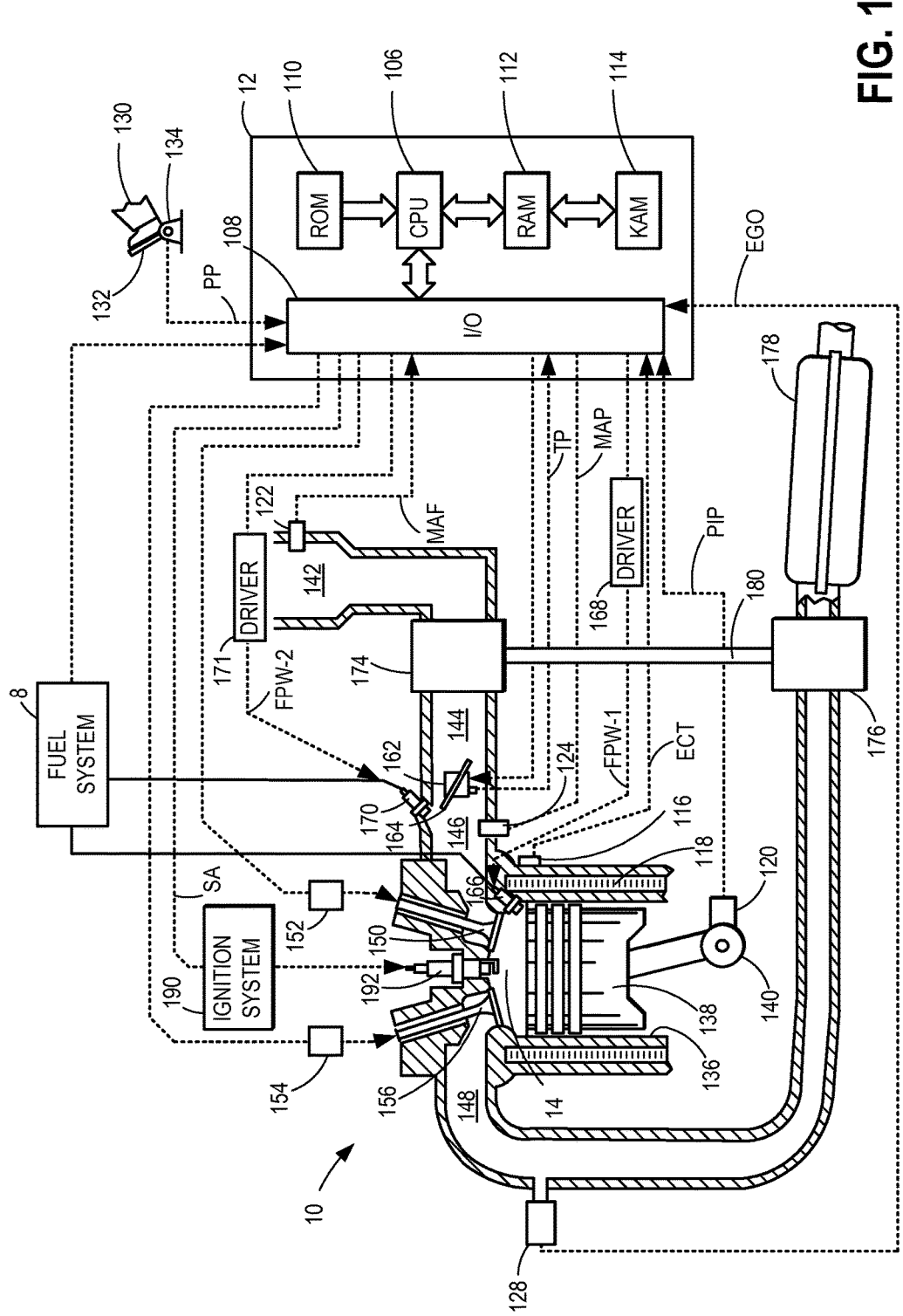
FIG. 1 schematically depicts an example embodiment of a cylinder of an internal combustion engine.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

FIG. 2 schematically depicts an example fuel system 8 of FIG. 1. Fuel system 8 may be operated to deliver fuel to an engine, such as engine 10 of FIG. 1. Fuel system 8 may be operated by a controller to perform some or all of the operations described with reference to the process flows of FIGS. 10-11.

Fuel system 8 can provide fuel to an engine from one or more different fuel sources. As a non-limiting example, a first fuel tank 202 and a second fuel tank 212 may be provided. While fuel tanks 202 and 212 are described in the context of discrete vessels for storing fuel, it should be appreciated that these fuel tanks may instead be configured as a single fuel tank having separate fuel storage regions that are separated by a wall or other suitable membrane. Further still, in some embodiments, this membrane may be configured to selectively transfer select components of a fuel between the two or more fuel storage regions, thereby enabling a fuel mixture to be at least partially separated by the membrane into a first fuel type at the first fuel storage region and a second fuel type at the second fuel storage region.

In some examples, first fuel tank 202 may store fuel of a first fuel type while second fuel tank 212 may store fuel of a second fuel type, wherein the first and second fuel types are of differing composition. As a non-limiting example, the second fuel type contained in second fuel tank 212 may include a higher concentration of one or more components that provide the second fuel type with a greater relative knock suppressant capability than the first fuel.

By way of example, the first fuel and the second fuel may each include one or more hydrocarbon components, but the second fuel may also include a higher concentration of an alcohol component than the first fuel. Under some conditions, this alcohol component can provide knock suppression to the engine when delivered in a suitable amount relative to the first fuel, and may include any suitable alcohol such as ethanol, methanol, etc. Since alcohol can provide greater knock suppression than some hydrocarbon based fuels, such as gasoline and diesel, due to the increased latent heat of vaporization and charge cooling capacity of the alcohol, a fuel containing a higher concentration of an alcohol component can be selectively used to provide increased resistance to engine knock during select operating conditions.

As another example, the alcohol (e.g. methanol, ethanol) may have water added to it. As such, water reduces the alcohol fuel's flammability giving an increased flexibility in storing the fuel. Additionally, the water content's heat of vaporization enhances the ability of the alcohol fuel to act as a knock suppressant. Water may also act as a diluent for temperature control of the combustion chamber, such as combustion chamber 14 of FIG. 1. Further still, the water content can reduce the fuel's overall cost.

As a specific non-limiting example, the first fuel type in the first fuel tank may include gasoline and the second fuel type in the second fuel tank may include ethanol. As another non-limiting example, the first fuel type may include gasoline and the second fuel type may include a mixture of gasoline and ethanol. In still other examples, the first fuel type and the second fuel type may each include gasoline and ethanol, whereby the second fuel type includes a higher concentration of the ethanol component than the first fuel (e.g., E10 as the first fuel type and E85 as the second fuel type). As yet another example, the second fuel type may have a relatively higher octane rating than the first fuel type, thereby making the second fuel a more effective knock suppressant than the first fuel. It should be appreciated that these examples should be considered non-limiting as other suitable fuels may be used that have relatively different knock suppression characteristics. In still other examples, each of the first and second fuel tanks may store the same fuel. While the depicted example illustrates two fuel tanks with two different fuel types, it will be appreciated that in alternate embodiments, only a single fuel tank with a single type of fuel may be present.

Fuel tanks 202 and 212 may differ in their fuel storage capacities. In the depicted example, where second fuel tank 212 stores a fuel with a higher knock suppressant capability, second fuel tank 212 may have a smaller fuel storage capacity than first fuel tank 202. However, it should be appreciated that in alternate embodiments, fuel tanks 202 and 212 may have the same fuel storage capacity.

Fuel may be provided to fuel tanks 202 and 212 via respective fuel filling passages 204 and 214. In one example, where the fuel tanks store different fuel types, fuel filling passages 204 and 214 may include fuel identification markings for identifying the type of fuel that is to be provided to the corresponding fuel tank.

A first low pressure fuel pump (LPP) 208 in communication with first fuel tank 202 may be operated to supply the first type of fuel from the first fuel tank 202 to a first group of port injectors 242, via a first fuel passage 230. In one example, first fuel pump 208 may be an electrically-powered lower pressure fuel pump disposed at least partially within first fuel tank 202. Fuel lifted by first fuel pump 208 may be supplied at a lower pressure into a first fuel rail 240 coupled to one or more fuel injectors of first group of port injectors 242 (herein also referred to as first injector group). While first fuel rail 240 is shown dispensing fuel to four fuel injectors of first injector group 242, it will be appreciated that first fuel rail 240 may dispense fuel to any suitable number of fuel injectors. As one example, first fuel rail 240 may dispense fuel to one fuel injector of first injector group 242 for each cylinder of the engine. Note that in other examples, first fuel passage 230 may provide fuel to the fuel injectors of first injector group 242 via two or more fuel rails. For example, where the engine cylinders are configured in a V-type configuration, two fuel rails may be used to distribute fuel from the first fuel passage to each of the fuel injectors of the first injector group.

Direct injection fuel pump 228 that is included in second fuel passage 232 and may be supplied fuel via LPP 208 or LPP 218. In one example, direct injection fuel pump 228 may be an engine-driven, positive-displacement pump. Direct injection fuel pump 228 may be in communication with a group of direct injectors 252 via a second fuel rail 250, and the group of port injectors 242 via a solenoid valve 236. Thus, lower pressure fuel lifted by first fuel pump 208 may be further pressurized by direct injection fuel pump 228 so as to supply higher pressure fuel for direct injection to second fuel rail 250 coupled to one or more direct fuel injectors 252 (herein also referred to as second injector group). In some examples, a fuel filter (not shown) may be disposed upstream of direct injection fuel pump 228 to remove particulates from the fuel. Further, in some examples a fuel pressure accumulator (not shown) may be coupled downstream of the fuel filter, between the low pressure pump and the high pressure pump.

A second low pressure fuel pump 218 in communication with second fuel tank 212 may be operated to supply the second type of fuel from the second fuel tank 202 to the direct injectors 252, via the second fuel passage 232. In this way, second fuel passage 232 fluidly couples each of the first fuel tank and the second fuel tank to the group of direct injectors. In one example, second fuel pump 218 may also be an electrically-powered low pressure fuel pump (LPP), disposed at least partially within second fuel tank 212. Thus, lower pressure fuel lifted by low pressure fuel pump 218 may be further pressurized by higher pressure fuel pump 228 so as to supply higher pressure fuel for direct injection to second fuel rail 250 coupled to one or more direct fuel injectors. In one example, second low pressure fuel pump 218 and direct injection fuel pump 228 can be operated to provide the second fuel type at a higher fuel pressure to second fuel rail 250 than the fuel pressure of the first fuel type that is provided to first fuel rail 240 by first low pressure fuel pump 208.

Fluid communication between first fuel passage 230 and second fuel passage 232 may be achieved through first and second bypass passages 224 and 234. Specifically, first bypass passage 224 may couple first fuel passage 230 to second fuel passage 232 upstream of direct injection fuel pump 228, while second bypass passage 234 may couple first fuel passage 230 to second fuel passage 232 downstream of direct injection fuel pump 228. One or more pressure relief valves may be included in the fuel passages and/or bypass passages to resist or inhibit fuel flow back into the fuel storage tanks. For example, a first pressure relief valve 226 may be provided in first bypass passage 224 to reduce or prevent back flow of fuel from second fuel passage 232 to first fuel passage 230 and first fuel tank 202. A second pressure relief valve 222 may be provided in second fuel passage 232 to reduce or prevent back flow of fuel from the first or second fuel passages into second fuel tank 212. In one example, lower pressure pumps 208 and 218 may have pressure relief valves integrated into the pumps. The integrated pressure relief valves may limit the pressure in the respective lift pump fuel lines. For example, a pressure relief valve integrated in first fuel pump 208 may limit the pressure that would otherwise be generated in first fuel rail 240 if solenoid valve 236 were (intentionally or unintentionally) open and while direct injection fuel pump 228 were pumping.

In some examples, the first and/or second bypass passages may also be used to transfer fuel between fuel tanks 202 and 212. Fuel transfer may be facilitated by the inclusion of additional check valves, pressure relief valves, solenoid valves, and/or pumps in the first or second bypass passage, for example, solenoid valve 236. In still other examples, one of the fuel storage tanks may be arranged at a higher elevation than the other fuel storage tank, whereby fuel may be transferred from the higher fuel storage tank to the lower fuel storage tank via one or more of the bypass passages. In this way, fuel may be transferred between fuel storage tanks by gravity without necessarily requiring a fuel pump to facilitate the fuel transfer.

The various components of fuel system 8 communicate with an engine control system, such as controller 12. For example, controller 12 may receive an indication of operating conditions from various sensors associated with fuel system 8 in addition to the sensors previously described with reference to FIG. 1. The various inputs may include, for example, an indication of an amount of fuel stored in each of fuel storage tanks 202 and 212 via fuel level sensors 206 and 216, respectively. Controller 12 may also receive an indication of fuel composition from one or more fuel composition sensors, in addition to, or as an alternative to, an indication of a fuel composition that is inferred from an exhaust gas sensor (such as sensor 128 of FIG. 1). For example, an indication of fuel composition of fuel stored in fuel storage tanks 202 and 212 may be provided by fuel composition sensors 210 and 220, respectively. Additionally or alternatively, one or more fuel composition sensors may be provided at any suitable location along the fuel passages between the fuel storage tanks and their respective fuel injector groups. For example, fuel composition sensor 238 may be provided at first fuel rail 240 or along first fuel passage 230, and/or fuel composition sensor 248 may be provided at second fuel rail 250 or along second fuel passage 232. As a non-limiting example, the fuel composition sensors can provide controller 12 with an indication of a concentration of a knock suppressing component contained in the fuel or an indication of an octane rating of the fuel. For example, one or more of the fuel composition sensors may provide an indication of an alcohol content of the fuel.

Note that the relative location of the fuel composition sensors within the fuel delivery system can provide different advantages. For example, sensors 238 and 248, arranged at the fuel rails or along the fuel passages coupling the fuel injectors with one or more fuel storage tanks, can provide an indication of a resulting fuel composition where two or more different fuels are combined before being delivered to the engine. In contrast, sensors 210 and 220 may provide an indication of the fuel composition at the fuel storage tanks, which may differ from the composition of the fuel actually delivered to the engine.

Controller 12 can also control the operation of each of fuel pumps 208, 218, and 228 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 12 may be used to send a control signal to each of the low pressure pumps, as required, to adjust the output (e.g. speed) of the respective low pressure pump. The amount of first or second fuel type that is delivered to the group of direct injectors via the direct injection pump may be adjusted by adjusting and coordinating the output of the first or second LPP and the direct injection pump. For example, the lower pressure fuel pump and the higher pressure fuel pump may be operated to maintain a prescribed fuel rail pressure. A fuel rail pressure sensor coupled to the second fuel rail may be configured to provide an estimate of the fuel pressure available at the group of direct injectors. Then, based on a difference between the estimated rail pressure and a desired rail pressure, the pump outputs may be adjusted. In one example, where the high pressure fuel pump is a volumetric displacement fuel pump, the controller may adjust a flow control valve of the high pressure pump to vary the effective pump volume of each pump stroke.

As such, while the direct injection fuel pump is operating, reaching a peak pressure in the compression chamber may ensure lubrication of the direct injection fuel pump. Furthermore, reaching the peak compression chamber pressure may also have a minor cooling effect. However, during conditions when direct injection fuel pump operation is not requested, such as when no direct injection of fuel is requested, and/or when the fuel level in the second fuel tank 212 is below a threshold (that is, there is not enough knock-suppressing fuel available), the direct injection fuel pump may not be sufficiently lubricated if fuel flow through the pump is discontinued.

In alternate embodiments of fuel system 8 of FIG. 2, second fuel tank 212 may be eliminated such that fuel system 8 is a single fuel system with both port and direct fuel injection. Also, more than two fuels may be utilized in other embodiments. Additionally, in other examples, fuel may be supplied only to direct injectors 252 and port injectors 242 may be omitted. In this example system, low pressure fuel pump 208 supplies fuel to direct injection fuel pump 228 via bypass passage 224. Controller 12 adjusts the output of direct injection fuel pump 228 via adjusting a flow control valve of direct injection pump 228. Direct injection pump may stop providing fuel to fuel rail 250 during selected conditions such as during vehicle deceleration or while the vehicle is traveling downhill. Further, during vehicle deceleration or while the vehicle is traveling downhill, one or more direct fuel injectors 252 may be deactivated.

FIG. 3 shows an example embodiment of the direct injection fuel pump 228 shown in the system of FIG. 2. Inlet 303 of direct injection fuel pump compression chamber 308 is supplied fuel via a low pressure fuel pump as shown in FIG. 2. The fuel may be pressurized upon its passage through direct injection fuel pump 228 and supplied to a fuel rail through pump outlet 304. In the depicted example, direct injection pump 228 may be a mechanically-driven displacement pump that includes a pump piston 306 and piston rod 320, a pump compression chamber 308 (herein also referred to as compression chamber), and a step-room 318. A passage that connects step-room 318 to a pump inlet 399 may include an accumulator 309, wherein the passage allows fuel from the step-room to re-enter the low pressure line surrounding inlet 399. Assuming that piston 306 is at a bottom dead center (BDC) position in FIG. 3, the pump displacement may be represented as displacement 377. The displacement of the DI pump may be measured or estimated as the volume swept by piston 306 as it moves from top dead center (TDC) to BDC or vice versa. A second volume also exists within compression chamber 308, the second volume being a clearance volume 378 of the pump. The clearance volume defines the region in compression chamber 308 that remains when piston 306 is at TDC. In other words, the addition of volumes 377 and 378 form compression chamber 308. Piston 306 also includes a top 305 and a bottom 307. The step-room and compression chamber may include cavities positioned on opposing sides of the pump piston. In one example, engine controller 12 may be configured to drive the piston 306 in direct injection pump 228 by driving cam 310. Cam 310 includes four lobes and completes one rotation for every two engine crankshaft rotations.

A solenoid activated inlet check valve 312, or spill valve, may be coupled to pump inlet 303. Controller 12 may be configured to regulate fuel flow through inlet check valve 312 by energizing or de-energizing the solenoid valve (based on the solenoid valve configuration) in synchronism with the driving cam. Accordingly, solenoid activated inlet check valve 312 may be operated in two modes. In a first mode, solenoid activated check valve 312 is positioned within inlet 303 to limit (e g inhibit) the amount of fuel traveling upstream of the solenoid activated check valve 312. In comparison, in the second mode, solenoid activated check valve 312 is effectively disabled and fuel can travel upstream and downstream of inlet check valve.

As such, solenoid activated check valve 312 may be configured to regulate the mass (or volume) of fuel compressed into the direct injection fuel pump. In one example, controller 12 may adjust a closing timing of the solenoid activated check valve to regulate the mass of fuel compressed. For example, a late inlet check valve closing may reduce the amount of fuel mass ingested into the compression chamber 308. The solenoid activated check valve opening and closing timings may be coordinated with respect to stroke timings of the direct injection fuel pump.

Pump inlet 399 allows fuel to check valve 302 and pressure relief valve 301. Check valve 302 is positioned upstream of solenoid activated check valve 312 along passage 335. Check valve 302 is biased to prevent fuel flow out of solenoid activated check valve 312 and into pump inlet 399. Check valve 302 allows flow from the low pressure fuel pump to solenoid activated check valve 312. Check valve 302 is coupled in parallel with pressure relief valve 301. Pressure relief valve 301 allows fuel flow out of solenoid activated check valve 312 toward the low pressure fuel pump when pressure between pressure relief valve 301 and solenoid operated check valve 312 is greater than a predetermined pressure (e.g., 10 bar). When solenoid operated check valve 312 is deactivated (e.g., not electrically energized), solenoid operated check valve operates in a pass-through mode and pressure relief valve 301 regulates pressure in compression chamber 308 to the single pressure relief setting of pressure relief valve 301 (e.g., 15 bar). Regulating the pressure in compression chamber 308 allows a pressure differential to form from piston top 305 to piston bottom 307. The pressure in step-room 318 is at the pressure of the outlet of the low pressure pump (e.g., 5 bar) while the pressure at piston top is at pressure relief valve regulation pressure (e.g., 15 bar). The pressure differential allows fuel to seep from piston top 305 to piston bottom 307 through the clearance between piston 306 and pump cylinder wall 350, thereby lubricating direct injection fuel pump 228.

Piston 306 reciprocates up and down within compression chamber 308. Direct fuel injection pump 228 is in a compression stroke when piston 306 is traveling in a direction that reduces the volume of compression chamber 308. Direct fuel injection pump 228 is in a suction stroke when piston 306 is traveling in a direction that increases the volume of compression chamber 308.

A forward flow outlet check valve 316 may be coupled downstream of an outlet 304 of the compression chamber 308. Outlet check valve 316 opens to allow fuel to flow from the compression chamber outlet 304 into a fuel rail only when a pressure at the outlet of direct injection fuel pump 228 (e.g., a compression chamber outlet pressure) is higher than the fuel rail pressure. Thus, during conditions when direct injection fuel pump operation is not requested, controller 12 may deactivate solenoid activated inlet check valve 312 and pressure relief valve 301 regulates pressure in compression chamber to a single substantially constant (e.g., regulation pressure ±0.5 bar) pressure during most of the compression stroke. On the intake stroke the pressure in compression chamber 308 drops to a pressure near the pressure of the lift pump (208 and/or 218). Lubrication of DI pump 228 may occur when the pressure in compression chamber 308 exceeds the pressure in step-room 318. This difference in pressures may also contribute to pump lubrication when controller 12 deactivates solenoid activated check valve 312. Deactivation of valve 312 may also reduce noise produced by valve 312. One result of this regulation method is that the fuel rail is regulated to a minimum pressure approximately the pressure relief of valve 302. Thus, if valve 302 has a pressure relief setting of 10 bar, the fuel rail pressure becomes 15 bar because this 10 bar adds to the 5 bar of lift pump pressure. Specifically, the fuel pressure in compression chamber 308 is regulated during the compression stroke of direct injection fuel pump 228. Thus, during at least the compression stroke of direct injection fuel pump 228, lubrication is provided to the pump. When direct fuel injection pump enters a suction stroke, fuel pressure in the compression chamber may be reduced while still some level of lubrication may be provided as long as the pressure differential remains. Another check valve 314 (pressure relief valve) may be placed in parallel with check valve 316. Valve 314 allows fuel flow out of the DI fuel rail toward pump outlet 304 when the fuel rail pressure is greater than a predetermined pressure.

It is noted here that DI pump 228 of FIG. 3 is presented as an illustrative example of one possible configuration for a DI pump. Components shown in FIG. 3 may be removed and/or changed while additional components not presently shown may be added to pump 228 while still maintaining the ability to deliver high-pressure fuel to a direct injection fuel rail. As an example, pressure relief valve 301 and check valve 302 may be removed in other embodiments of fuel pump 228. Furthermore, the methods presented hereafter may be applied to various configurations of pump 228 along with various configurations of fuel system 8 of FIG. 2. In particular, the zero flow lubrication methods described below may be implemented in various configurations of pump 228 without adversely affecting normal operation of the pump 228. In this way, the zero flow lubrication methods may be versatile and adapted to a variety of fuel and HP pump systems.

It will be appreciated that while the fuel system configuration of FIGS. 2-3 depicts the LPP being used to deliver fuel to the port injection fuel rail, in alternate fuel system configurations, the LPP may be used to deliver fuel at a default fuel pressure to the HPP inlet, and then the pressure of the port injection fuel rail, which is coupled to the inlet of the HPP, may be raised above the default pressure of the LPP via backflow from the HPP. As such, this configuration enables the single HPP to provide a variable high pressure to the direct injection fuel rail (e.g., 20-200 bar) while providing a fixed high pressure to the port injection fuel rail (e.g., 20 bar).

Direct injection fuel pumps such as pump 228 of FIG. 3 may require a minimum amount of lubrication to remain useable and to inhibit the amount of wear that occurs between the piston and bore of the pump. Without sufficient lubrication, the interface between piston 306 and cylinder wall 350 (the bore of the pump) may be subjected to material removal (degradation) due to friction between the piston and cylinder wall as the piston reciprocates. During times when direct injection is not requested, such as when only port fuel injection is requested, pump durability may be affected. Specifically, the lubrication and cooling of the pump may be reduced while the high pressure pump is not operated, thereby leading to pump degradation. Therefore, it may be beneficial to continue operation of the high pressure pump even when direct injection is not requested. As such, operation of the high pressure pump may be adjusted to maintain a pressure at the outlet of the high pressure pump at or below the fuel rail pressure of the direct injection fuel rail. By maintaining the outlet pressure of the high pressure pump just below the fuel rail pressure, without allowing fuel to flow out of outlet 304 of the HP pump into the fuel rail, the HP pump may be kept lubricated, thereby reducing pump degradation. This general operation may be referred to as zero flow lubrication (ZFL). It is noted that other similar schemes may be implemented that maintain lubrication of the high pressure pump while fuel is not pumped into the direct injection fuel rail. For example, fuel rail pressure may be incrementally increased instead of being held constant in a different ZFL scheme.

For the implementation of the zero flow lubrication of the higher pressure pump, a relationship between the pump duty cycle and fuel rail pressure is learned and a transfer function determined based on the relationship. The relationship is a function of the fuel type and pump cam lift versus engine rotation, parameters which vary depending on the engine system. In addition, the relationship may vary with changes in fuel conditions, such as fuel temperature, pressure, and fuel alcohol content. If a fixed calibration is used, the correct duty cycle may not be provided for sufficient lubrication of the high pressure pump. For example, if the scheduled duty cycle is lower than desired for a given fuel rail pressure, the pump chamber pressure will also be lower than desired, causing lower lubrication to the high pressure pump. This may lead to pump degradation. Due to variability between engine systems, the transfer function is learned on-board the vehicle.

As elaborated herein, one approach to learning the relationship involves changing the high pressure pump duty cycle and monitoring the rail pressure to determine the steady state fuel rail pressure. For a given vehicle system, a transfer function is learnt that allows for adequate lubrication of the high pressure pump. Once the relationship between duty cycle and rail pressure is learned (i.e. the transfer function) for a particular engine system, the relationship can be used to modify pump operation during closed loop control. Closed loop control involves a feedback of rail pressure measurements so incremental adjustments to the pump duty cycle can be made to ensure proper pump lubrication while not drastically affecting the fuel rail pressure.

FIG. 4 depicts an example map 400 of high pressure pump operation. The map shows the relationship between HP pump control duty cycle and the fuel rail pressure. Note that from the deactivated pump (0% duty cycle) to a duty cycle threshold value 440, the fuel rail pressure does not change. This region is known as the dead zone. If one were to operate the HP pump during a closed loop control in the dead zone, severe limit cycling may occur. Therefore, the transfer function is learned and applied outside of the dead zone, in linear region 450 where the change in fuel rail pressure correlates with the change in duty cycle.

An example ZFL routine or test, used to attain zero flow rate data, is shown graphically in FIG. 5. The purpose of the ZFL test may be to generate data that corresponds to zero flow data, that is, data when substantially no fuel or no fuel is being pumped out of compression chamber 308 and into the DI fuel rail by the HP pump. The ZFL test, fully explained below, operates by incrementally increasing duty cycle of the HP pump and waiting for a steady-state response fuel rail pressure.

ZFL test 500 involves repeating a sub-routine to gain multiple data points, each data point comprising duty cycle and a fuel rail pressure. The collection of one data point of the multiple data points of FIG. 5 is detailed at FIG. 6. Data for the ZFL test is gathered while not direct injecting fuel into the engine, also known as zero injection flow rate. For example, ZFL test data may be gathered while only port injecting fuel into the spinning engine. Furthermore, since HP pump duty cycle during ZFL conditions may be dependent on engine (and HP pump) speed, a substantially constant engine idling speed may be desired during the slow ZFL test (or method). As such, in engines that utilize both port and direct fuel injection, an engine may be put into a stabilized idling condition with a substantially constant speed where direct injection is not requested and there is no fuel being pumped into the fuel rail that is coupled to HP pump 228.

ZFL test routine 500 shows commanded changes in pump duty cycle at plot 501 and the responsive changes in fuel rail pressure at plot 502. At plots 501 and 502, time is represented along the horizontal axis. Plot 503 shows how fuel rail pressure changes as a function of pump duty cycle. Plot 503 may also be referred to as the zero flow function, in that plot 503 shows a relationship between fuel rail pressure and duty cycle with a 0 flow rate since the HP pump is not sending fuel into the fuel rail. As such, the steps of ZFL test routine 500 are also elaborated at FIGS. 9-10.

The sequence of events according to the ZFL test of FIG. 5 is as follows: first, prior to time t1, pump duty cycle is being nominally controlled, thereby creating a response in fuel rail pressure. At time t1, a first pump duty cycle 521 is commanded and recorded along with the corresponding fuel rail pressure 531. Upon recording the values, duty cycle is increased to 522 and held for a time in between times t1 and t2. During this interval, the fuel rail pressure responds and gradually increases compared to the immediate increase in pump duty cycle. Due to the slow response of fuel rail pressure, the time interval to wait before taking second recordings may be 10 seconds, or until the fuel rail pressure reaches a steady-state value. After a time interval has elapsed (such as 10 seconds), the increased duty cycle 522 is recorded along with the steady-state fuel rail pressure 532 at time t2. The duty cycle is again incrementally increased to 523 and a similar amount of time elapses before recording duty cycle 523 and the responsive steady-state fuel rail pressure 533 at time t3. This same process is repeated at times t4 and t5. In this example method, five data points are recorded, each data point including a duty cycle value and a fuel rail pressure value pair as previously mentioned.

Since each of the data points contains two values (duty cycle and fuel rail pressure), the five data points may be plotted on the separate graph 503 where HP pump duty cycle is the horizontal axis and fuel rail pressure is the vertical axis. Each data point is plotted as its corresponding point on graph 503. For example, the data point containing duty cycle 521 and fuel rail pressure 531 is plotted as point 541 on graph 503, as directed by arrow 540. Points 541, 542, 543, 544, and 545 may lie along a straight line, and the straight line may be extended according to a slope of the line. Zero flow function 503 may be used to find data that may enhance pump performance, such as correcting timing errors in solenoid activated inlet check valve and determining various system properties such as the bulk modulus of the fuel pumped through the HP pump.

FIG. 6 shows a detailed collection of a single data point in the ZFL test routine of FIG. 5. For example, data depicted between t11 and t12 of FIG. 6 may correspond to data collection between t1 and t2 (or between t2 and t3, and so on) of FIG. 5. HP pump duty cycle, or closing of the spill valve, is shown at plot 601. Fuel rail pressure of the DI fuel rail is shown at plot 602. Rate of change in high pressure pump chamber pressure (or fuel rail pressure), that is dFRP/dt, is shown at plot 603. In all plots, time is represented along the horizontal axis.

Referring to FIG. 6, initially, during a time interval between t0 and t11, the HP pump maintains a substantially constant duty cycle. In the depicted example, the substantially constant duty cycle is a zero duty cycle (plot 601). While no duty cycle is applied, the fuel rail pressure still rises to fuel rail pressure 612 due to thermal effects of fuel. An average rate of change of chamber pressure (or fuel rail pressure) during the application of the zero duty cycle is also learned (plot 603) as the reference or background change in fuel rail pressure due to fluctuations in fuel temperature.

At t11, a first pump duty cycle is commanded, which is an increase from the zero duty cycle. The first pump duty cycle is held constant in between times t11 and t13. In one example, the first pump duty cycle is a larger step than the subsequent steps. For example, the first duty cycle applied at t11 may be an increase from the zero duty cycle to 5%, while the subsequent duty cycles applied at t13 may be an increase of 1% (that is, from 5% to 6%). During the interval t11-t13, the fuel rail pressure responds and gradually increases compared to the immediate increase in pump duty cycle. Ideally, the fuel rail pressure would respond in the same fashion as the HP pump duty cycle. However, due to the slow response of fuel rail pressure, the time taken for the fuel rail pressure to stabilize and reach a substantially steady-state value may be as long as 10 seconds.

When the duty cycle is applied at t11, the rate of change in HPP chamber pressure (or fuel rail pressure), however, is immediate, as indicated by the peak at t11. Then, the rate of pressure change reduces as the fuel rail pressure stabilizes towards the steady-state value, as indicated by the plateau following the peak after t12. Thus, after t12, the first duty cycle applied may be recorded (measured) along with the corresponding steady-state fuel rail pressure.

The procedure is then repeated with a second duty cycle being applied at t13. As in the preceding case, as soon as the duty cycle is applied, fuel rail pressure changes with a spike in the rate of change in fuel rail pressure. Then, the rate of change drops as the fuel rail pressure stabilizes after t14. Thus, after t14, the second duty cycle applied may be recorded (measured) along with the corresponding steady-state fuel rail pressure. The routine is repeated, as described at FIG. 5, until sufficient data points are available to draw a line and determined a transfer function based on the slope, offset, and/or intercept of the drawn line.

Determining parameters such as duty cycle and fuel rail pressure in the routine of FIGS. 5-6 and other methods described herein may include using various sensors attached to controller 12 of FIGS. 1-3, such as one or more of fuel mass sensors, fuel volume sensors, fuel pressure sensors, etc., located in various parts of the fuel system. For example, direct injection fuel rail pressure may be measured by a pressure sensor that is connected to a controller with computer readable instructions stored in non-transitory memory for executing a closed loop fuel rail pressure control scheme. Other sensor arrangements are possible for attaining the necessary data for other methods.

The inventors herein have recognized that the transfer function for the HPP is learned for a given fuel system at a given temperature condition. However, at the time that ZFL is requested, the fuel system conditions may be significantly different. For example, due to refilling events, the composition of fuel in the fuel tank at the time ZFL is requested may be different from the composition of fuel in the fuel tank at the time the transfer function was learned. There may also be variations due to differences in ambient temperature conditions. Further still, based on how long the engine was operating, and diurnal temperature fluctuations, the temperature and pressure of the fuel in the fuel tank at the time ZFL is requested may be different from that of fuel in the fuel tank at the time the transfer function was learned. As such, a fuel bulk modulus estimate is affected by fuel conditions such as fuel temperature, fuel pressure, fuel composition, fuel alcohol content, etc. Thus, even small changes in fuel conditions can result in larger changes in fuel bulk modulus estimates.

An example change in fuel bulk modulus, and thereby a change in fuel rail pressure is shown with reference to plots 700, 750 of FIG. 7. Specifically, plot 700 compares changes in bulk modulus (dashed line) to changes in fuel rail pressure (FRP, solid line) as the inferred fuel rail temperature changes at a first constant duty cycle (6%). Plot 750 compares changes in bulk modulus (dashed line) to changes in fuel rail pressure (FRP, solid line) as the inferred fuel rail temperature changes at a second, higher constant duty cycle (9%). As can be seen, even small changes in fuel rail temperature can lead to substantial changes in fuel rail pressure and fuel bulk modulus, even as the duty cycle applied to the HPP remains constant.

Due to the phenomenon discussed above, and depicted at FIG. 7, during zero flow lubrication of a HPP and closed loop FRP control, the transfer function may be applied on a fuel bulk modulus that is different from the fuel bulk modulus at the time of learning, neither of which may correspond to nominal conditions. However, the transfer function is learned for nominal fuel bulk modulus conditions. As a result, there may be errors due to the duty cycle applied not providing the desired amount of lubrication to the HPP, or raising the fuel rail pressure when it is desired not to. To reduce these errors, the learned transfer function may be corrected with a correction factor that compensates for the difference in fuel bulk modulus at the time of ZFL transfer function application relative to nominal fuel bulk modulus conditions.

FIG. 8 shows a map 800 comparing an uncorrected transfer function (solid line) relative to a corrected transfer function (dashed line) at a given duty cycle. The transfer function without the bulk modulus correction (solid line) may be determined according to the equation:

$$F(x)(\text{uncorrected}) = \frac{\Delta(DC)}{\Delta(FRP)}$$

In comparison, the transfer function with the bulk modulus correction (dashed line) may be determined according to the equation:

$$F(x)(\text{corrected}) = \frac{\Delta(DC)}{\frac{(FRP)_1 * (BM)_{base}}{(BM)_1} - \frac{(FRP)_0 * (BM)_{base}}{(BM)_0}}$$

where DC is the duty cycle, $FRP_1$ is the fuel rail pressure at the test condition where the data is obtained, $FRP_0$ is the fuel rail pressure at a calibratable nominal condition, such as a 1000 psi, $BM_1$ is the bulk modulus at the test condition where the data is obtained, $BM_0$ is the bulk modulus at the current fuel temperature condition and at $FRP_0$ rail pressure (example 1000 psi), and $BM_{base}$ is the bulk modulus at a nominal rail temperature such as 300 deg K. As can be seen, from FIG. 8), the calculated slope for the transfer function, as shown by the solid line, is increasing with increasing temperature. This is due to the change in bulk modulus of the fuel with change in the fuel temperature in the rail. By correcting slope for change in the bulk modulus so as to adjust the slope to the desired rail pressure (1000 psi example) and to the nominal fuel rail temperature condition (for example 300 deg K), the slope is nearly constant. The corrected slope is shown by the dotted line in FIG. 8).

Figure 9:
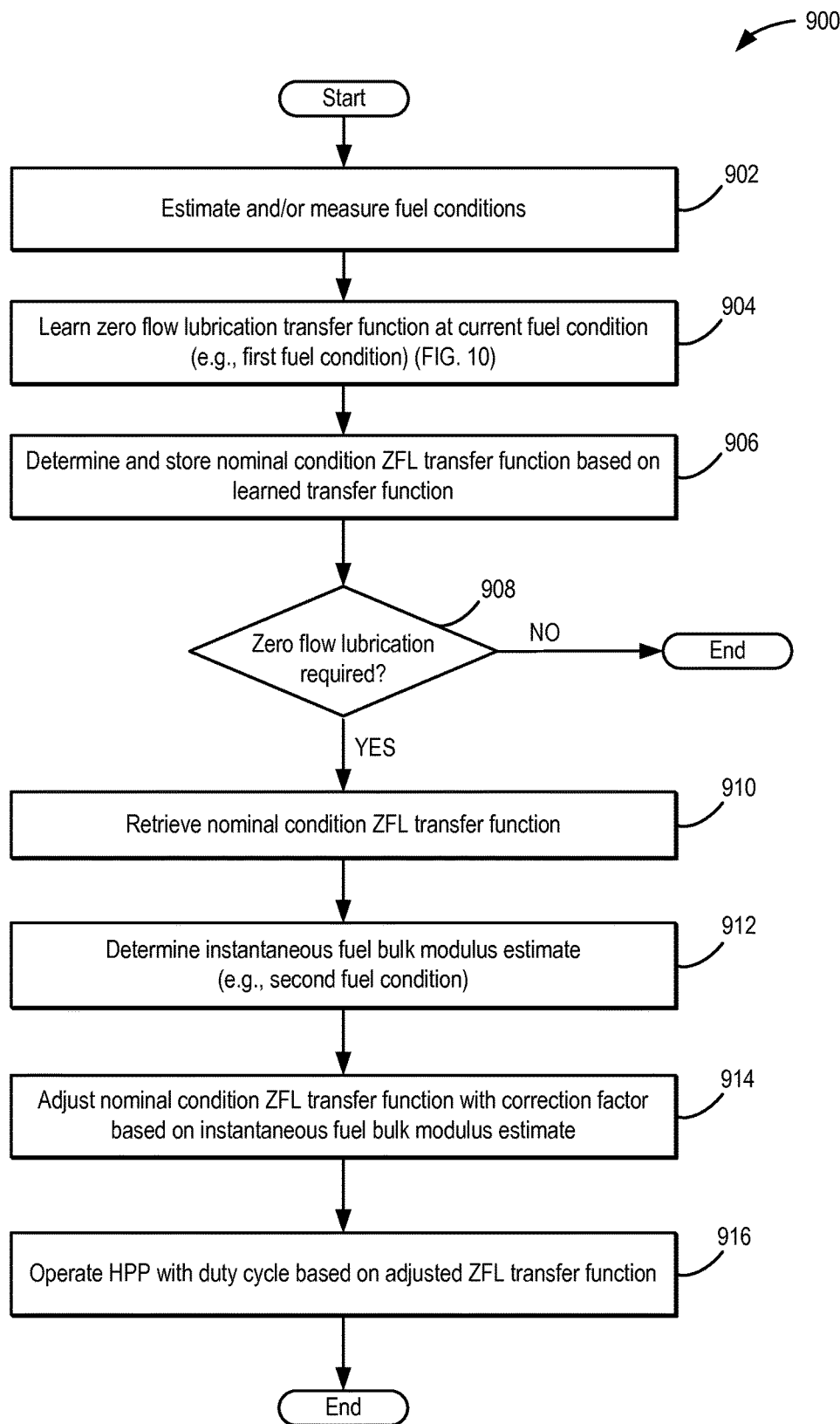
FIG. 9 depicts an example routine for learning a ZFL transfer function and applying the learned ZFL transfer function to ensure HPP lubrication.
Figure 10:
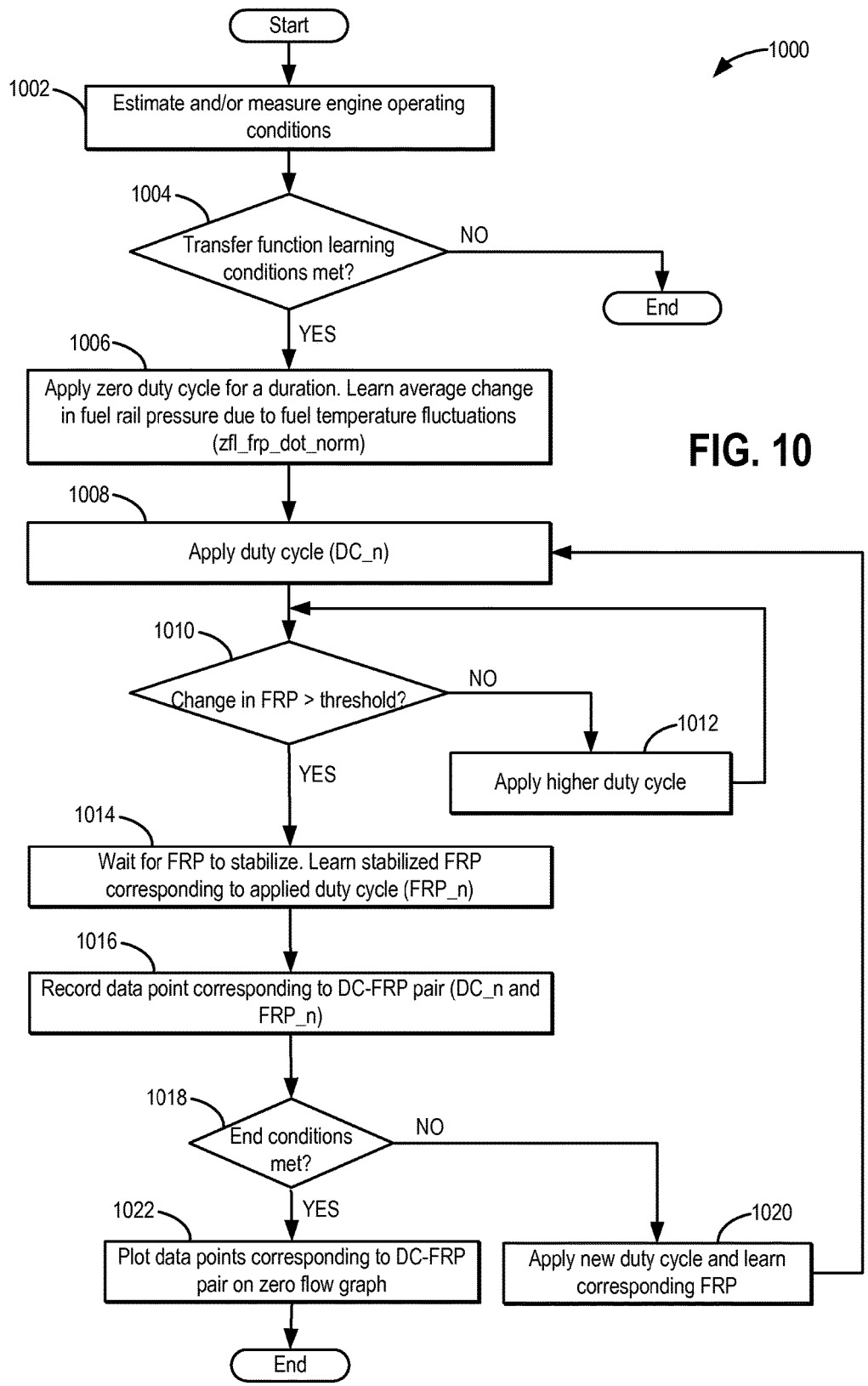
FIG. 10 depicts an example routine for learning the ZFL transfer function at non-nominal fuel bulk modulus conditions by incrementally changing a duty cycle applied to the HPP.

Turning now to FIGS. 9-10, an example method for learning a transfer function enabling ZFL of a HPP during non-nominal fuel bulk modulus conditions, and then applying the transfer function during other non-nominal fuel bulk modulus conditions, is shown. Routine 1000 of FIG. 10 may be performed as part of routine 900 of FIG. 9.

At 902, the routine of FIG. 9 includes estimating and/or measuring fuel conditions. These may include, one or more of fuel temperature, fuel pressure, and fuel composition. Still other fuel conditions may be determined. At 904, the routine includes learning a zero flow lubrication transfer function between duty cycle for the high pressure fuel pump and fuel rail pressure for a direct injector at the current fuel condition. For example, the transfer function may be learned at a first fuel condition. The first fuel condition may include a non-nominal fuel bulk modulus condition. As elaborated at FIG. 10, and depicted at FIG. 5, the controller may learn the transfer function by applying a first duty cycle to the high pressure fuel pump and learning a first stabilized direct injection fuel rail pressure corresponding to the first duty cycle; applying a second, higher duty cycle to the high pressure fuel pump and learning a second stabilized direct injection fuel rail pressure corresponding to the second duty cycle; plotting a graph including the first and second duty cycles versus the first and second stabilized fuel rail pressures; and determining the transfer function based on a slope and offset of the plotted graph.

At 906, after learning the initial transfer function at the first non-nominal bulk modulus fuel condition, the controller may determine a nominal bulk modulus condition transfer function based on the learned initial transfer function and the first fuel condition relative to a nominal fuel bulk modulus estimate. For example, the learned transfer function may be converted into an updated transfer function, the updated transfer function including the learned transfer function adjusted with a correction factor. The correction factor may be based on the current fuel bulk modulus estimate at the non-nominal conditions, as determined at 902, relative to a nominal fuel bulk modulus estimate. As such, the correction factor being based on the instantaneous fuel bulk modulus estimate includes the correction factor being based on the first fuel condition relative to the fuel bulk modulus estimate. For example, the correction factor may be based on a ratio of the first fuel condition to the fuel bulk modulus estimate. Alternatively, the correction factor may be based on a difference between the first fuel condition and the fuel bulk modulus estimate. The calculated nominal condition transfer function may be learned and stored in the controller's memory.

At 908, it may be determined if zero flow lubrication (ZFL) has been requested. In one example, ZFL is requested during operating conditions while not direct injection fuel into a still rotating engine. The still rotating engine may include the engine still carrying out combustion in one or more cylinders. For example, the engine may be carrying out combustion in all engine cylinders. In another example, the engine may be carrying out combustion in only a subset of engine cylinders. In still other examples, the engine may be spinning without carrying out combustion in any cylinder. Not direct injecting fuel into the engine may include only port injecting fuel into the still rotating engine via a port injection fuel rail coupled to the inlet of the high pressure pump and an outlet of the low pressure pump. The conditions when not direct injecting fuel into the engine may include engine speed and load being below respective thresholds. In another example, the conditions when not direct injecting fuel into the engine may include one of engine idling conditions where the fuel rail pressure is below a threshold, an engine-off condition, and a deceleration fuel shut-off condition where the fuel rail pressure is below the threshold. If ZFL conditions are not met, the routine may end.

If ZFL conditions are met, then at 910, the routine includes retrieving the nominal fuel bulk modulus transfer function. This is the transfer function that was previously learned at 904-906. At 912, an instantaneous fuel bulk modulus estimate may be determined. The instantaneous fuel bulk modulus estimate may be based on one or more of each of fuel conditions such as fuel temperature, fuel pressure, and fuel composition (e.g., fuel alcohol content). In one example, the fuel condition at which the ZFL is requested may also be a non-nominal fuel condition, such as a second fuel condition that is distinct from the first fuel condition at which the transfer function was learned.

Next, at 914, the routine includes adjusting the nominal transfer function with a correction factor based on the instantaneous fuel bulk modulus estimate. For example, the correction factor may be based on at least the second fuel condition at which ZFL is requested. In another example, the correction factor may be based on each of the first fuel condition (at which a transfer function was learned and a nominal transfer function was derived) and the second fuel condition (at which ZFL is requested).

At 916, the routine includes, during conditions when not direct injecting fuel into the engine, operating the high pressure fuel pump with a duty cycle that is based on the learned transfer function and the instantaneous fuel bulk modulus estimate. Operating with the duty cycle includes operating with the duty cycle to closed-loop control a fuel rail pressure of the fuel rail coupled to the direct injectors, and not allow the fuel rail pressure to increase more than desired. That is, closed loop control of the direct injection fuel rail pressure may be performed by applying a duty cycle that is based on the updated transfer function following correction with the non-nominal fuel bulk modulus based correction factor.

Now turning to FIG. 10, an example routine for learning the transfer function at non-nominal fuel bulk modulus conditions is shown. The routine of FIG. 10 may be performed as part of the routine of FIG. 9, such as at 904.

At 1002, engine operating conditions may be estimated and/or measured. These may include, for example, engine speed, torque demand, fuel conditions, ambient conditions, boost level, EGR level, etc. At 1004, ZFL transfer function learning conditions may be confirmed. Specifically, ZFL transfer function learning conditions may be considered met if fuel is not being direct injected into the still rotating engine. As elaborated with reference to FIG. 9, these include selected engine idling conditions where fuel is only port injected into the engine. If transfer function learning conditions are not met, the routine may end.

Upon confirming ZFL transfer function learning conditions, at 1006, the routine includes applying a zero duty cycle for a duration. An average change in fuel rail pressure due to the thermal effect of fuel temperature fluctuations may be learned and stored as zfl_frp_dot_norm. This may be a reference value. Next at 1008, an initial duty cycle is applied (DC_1). As such, the first duty cycle may have a higher step than subsequent duty cycles. For example, the first duty cycle may include a 5 or 10% duty cycle increase (e.g., from 0 to 5% or 0 to 10%), while subsequent duty cycles may include a 1% increase (e.g., from 5% to 6%, from 10% to 11%, etc.). At 1010, it may be determined if the change in fuel rail pressure following the step increase in duty cycle is substantial, for example, higher than a threshold. For example, it may be determined if a filtered rate of change in fuel rail pressure (zfl_frp_dot_filt) is higher than a threshold. For example, it may be confirmed that zfl_frp_dot_filt>zfl_frp_dot_norm+zfl_frp_dot_thresh. If yes, the routine may proceed. Else if there is no substantial increase in the fuel rail pressure following a duration since the first duty cycle was applied, at 1012, the routine includes determine that the applied duty cycle was insufficient and may proceed to apply a higher duty cycle and resume the steps. Specifically, if the rate of change in fuel rail pressure (frp_dot) does not change much, or takes too long to change, then a higher duty cycle may need to be applied to elicit the desired response.

If the rate of change in FRP following the applying of the initial duty cycle is sufficiently high and timely, and the rate of change in fuel rail pressure then stabilizes close to the background level (that is frp_dot≈frp_dot_norm), then at 1014, the routine includes waiting for the fuel rail pressure (or HPP chamber pressure) to stabilize to a steady-state value. As discussed with reference to FIGS. 5-6, the fuel rail pressure may stabilize after a duration (e.g., after 10 seconds) since the applying of the duty cycle. More specifically, the rate of change in chamber pressure may spike immediately after the duty cycle is applied, and then when the spike returns to a plateau (near the background or reference level estimated earlier with no duty cycle applied), the fuel rail pressure may start to stabilize. The stabilized FRP (FRP_1) may be learned as a function of the applied duty cycle (DC_1). A data point corresponding to the DC-FRP data pair (e.g., corresponding to DC_1; FRP_1) may then be recorded at 1016 and the data point may be plotted on a ZFL learning plot.

At 1018, it may be determined if end conditions have been met. For example, it may be determined if a sufficient number of data pairs have been collected. If a sufficient number of data points have not been collected, the routine moves to 1020 where a new duty cycle is applied and the corresponding FRP is learned. For example, the routine may return to 1008 to gradually increment the duty cycle (e.g., by 1-2%) and learn the corresponding FRP after stabilization of pump chamber pressure. The duty cycle may be increased to collected data points up to a percentage of the minimum to maximum rail pressure range. For example, data points may be collected by applying duty cycles that generate fuel rail pressures up to 50-60% of the maximum permissible fuel rail pressure, and no higher. In this way, during the learning, the pressure applied is limited to being below the pressure limit of the direct injection fuel rail. Once a sufficient number of data points have been collected, at 1022, the routine includes plotting the collected data points corresponding to DC-FRP pairs (e.g., DC_1-$n$ and FRP_1-$n$) on a zero flow graph. A transfer function is then determined based on the slope of the graph and further based on the offset or intercept of the graph. As discussed at FIG. 9, the learned transfer function, if learned at non-nominal conditions, may then be adjusted to a nominal transfer function by applying a correction factor to compensate for the deviation of the fuel conditions at the time of the learning from the nominal fuel conditions. Then, when applying the transfer function for ZFL, the calculated nominal transfer function may again be corrected for deviations of the fuel bulk modulus estimate at the time of the applying from nominal fuel bulk modulus estimates.

In this way, while not direct injecting fuel into a still rotating engine, a transfer function between duty cycle for a high pressure fuel pump and fuel rail pressure for a direct fuel injector may be learned at a first fuel condition; and then closed-loop control of fuel rail pressure may be performed at a second fuel condition by applying a duty cycle that is based on the learned transfer function and a correction factor. A controller may further determine a nominal bulk modulus condition transfer function based on the learned transfer function and the first fuel condition relative to a nominal bulk modulus estimate. Applying a duty cycle based on the learned transfer function may include applying a duty cycle based on the nominal bulk modulus condition transfer function and the second fuel condition relative to the nominal bulk modulus estimate. Herein, the correction factor may be based on each of the first and the second fuel conditions.

In another example, a fuel system comprises: one or more direct fuel injectors configured to direct inject fuel from a fuel tank into engine cylinders; one or more port fuel injectors configured to port inject fuel from the fuel tank into the engine cylinders; a high pressure fuel pump positioned downstream of a low pressure lift pump; a direct injection fuel rail receiving fuel from the high pressure fuel pump and fluidly coupled to the one or more direct fuel injectors; and a controller. The computer may be configured with computer readable instructions stored in non-transitory memory for: while only port injecting fuel into an engine and while the engine is in a stabilized idling condition, operating the high pressure fuel pump with a duty cycle based on an instantaneous bulk modulus estimate and a transfer function between the duty cycle for the high pressure fuel pump and direct injection fuel rail pressure at nominal bulk modulus conditions, wherein the transfer function is learned at non-nominal bulk modulus conditions. The transfer function is learned at a first non-nominal bulk modulus condition and the operating of the high pressure fuel pump occurs at a second, different non-nominal bulk modulus condition. Further, the transfer function at nominal bulk modulus conditions is learned based on a transfer function estimated at the first non-nominal bulk modulus condition and a correction factor based on fuel bulk modulus at the first non-nominal bulk modulus condition relative to a nominal bulk modulus estimate. The controller may include further instructions for learning the transfer function by applying a first duty cycle to the high pressure fuel pump and learning a first stabilized direct injection fuel rail pressure corresponding to the first duty cycle; applying a second, higher duty cycle to the high pressure fuel pump and learning a second stabilized direct injection fuel rail pressure corresponding to the second duty cycle; plotting a graph including the first and second duty cycles versus the first and second stabilized fuel rail pressures; and determining the transfer function based on a slope and offset of the plotted graph.

The technical effect of correcting a ZFL transfer function with a correction factor that is based on the fuel bulk modulus estimate at the time of applying the transfer function is that the robustness of ZFL controls to adapt for various fuel systems and fuel types is increased. In addition, errors in high pressure fuel pump lubrication and direct injection fuel rail pressure control resulting from discrepancies between an existing fuel bulk modulus and a nominal fuel bulk modulus, as well as discrepancies between the fuel bulk modulus at the time of learning the transfer function relative to the fuel bulk modulus at the time of applying the transfer function, can be reduced. In addition, transfer functions can be learned at any fuel condition and advantageously applied at any other fuel condition, improving the range of fuel types over which a transfer function can be applied. As such, this also reduces the need for constant updating of a transfer function each time fuel conditions change (such as at each fuel tank refilling event). Furthermore, the bulk modulus corrected transfer function also allows the variability of the pump response due to variability between engine systems to be quantified and compensated for. Overall, high pressure fuel pump zero flow lubrication is improved, reducing degradation of the high pressure pump.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
   learning a transfer function between a duty cycle for a high pressure fuel pump and fuel rail pressure for a direct fuel injector for nominal bulk modulus conditions; and
   during conditions when not direct injecting fuel into an engine, operating the fuel pump with a duty cycle based on the learned transfer function and an instantaneous bulk modulus estimate.

2. The method of claim 1, wherein the instantaneous bulk modulus estimate is based on fuel conditions including one or more of fuel temperature, fuel pressure, and fuel composition.

3. The method of claim 2, wherein the fuel composition includes a fuel alcohol content.

4. The method of claim 1, wherein the transfer function includes an affine relationship.

5. The method of claim 1, wherein the operating includes operating the high pressure fuel pump with a duty cycle based on an updated transfer function, the updated transfer function including the learned transfer function adjusted with a correction factor, the correction factor based on the instantaneous bulk modulus estimate relative to the nominal bulk modulus conditions.

6. The method of claim 1, wherein the direct fuel injector is coupled to the high pressure fuel pump, and wherein the engine further includes a port fuel injector, and wherein during the conditions when not direct injecting fuel into the engine include the engine being fueled via the port injector only.

7. The method of claim 1, wherein the conditions when not direct injecting fuel into the engine include engine speed and load being below respective thresholds.

8. The method of claim 1, wherein the conditions when not direct injecting fuel into the engine include one of engine idling conditions where the fuel rail pressure is below a threshold, an engine-off condition, and a deceleration fuel shut-off condition where the fuel rail pressure is below the threshold.

9. The method of claim 1, wherein operating with the duty cycle includes operating with the duty cycle to enable closed-loop control of fuel rail pressure.

10. The method of claim 1, wherein learning the transfer function for nominal bulk modulus conditions includes learning an initial transfer function at non-nominal bulk modulus conditions and adjusting the initial transfer function with a correction factor based on the non-nominal bulk modulus conditions relative to the nominal bulk modulus conditions.

11. A fuel system, comprising:
   one or more direct fuel injectors configured to direct inject fuel from a fuel tank into engine cylinders;
   one or more port fuel injectors configured to port inject fuel from the fuel tank into the engine cylinders;
   a high pressure fuel pump positioned downstream of a low pressure lift pump;
   a direct injection fuel rail receiving fuel from the high pressure fuel pump and fluidly coupled to the one or more direct fuel injectors; and
   a controller with computer readable instructions stored in non-transitory memory for:
      while only port injecting fuel into an engine and while the engine is in a stabilized idling condition, operating the high pressure fuel pump with a duty cycle based on an instantaneous bulk modulus estimate and a transfer function between the duty cycle for the high pressure fuel pump and direct injection fuel rail pressure at nominal bulk modulus conditions, wherein the transfer function is learned at non-nominal bulk modulus conditions.

12. The system of claim 11, wherein the transfer function is learned at a first non-nominal bulk modulus condition and wherein the operating of the high pressure fuel pump occurs at a second, different non-nominal bulk modulus condition.

13. The system of claim 12, wherein the transfer function at nominal bulk modulus conditions is learned based on a transfer function estimated at the first non-nominal bulk modulus condition and a correction factor based on fuel bulk modulus at the first non-nominal bulk modulus condition relative to a nominal bulk modulus estimate.

14. The system of claim 13, wherein the controller includes further instructions for learning the transfer function by applying a first duty cycle to the high pressure fuel pump and learning a first stabilized direct injection fuel rail pressure corresponding to the first duty cycle; applying a second, higher duty cycle to the high pressure fuel pump and learning a second stabilized direct injection fuel rail pressure corresponding to the second duty cycle; plotting a graph including the first and second duty cycles versus the first and second stabilized direct injection fuel rail pressures; and determining the transfer function based on a slope and offset of the plotted graph.

\* \* \* \* \*